United States Patent [19]
Kingman

[11] Patent Number: 5,397,102
[45] Date of Patent: Mar. 14, 1995

[54] LEAD-FREE FAUCET HOUSING
[75] Inventor: Ross E. Kingman, Elyria, Ohio
[73] Assignee: Moen Incorporated, North Olmsted, Ohio
[21] Appl. No.: 251,106
[22] Filed: May 31, 1994
[51] Int. Cl.$^6$ ............................................. F16K 21/00
[52] U.S. Cl. ................................... 251/368; 137/615; 137/801; 4/678; 285/921
[58] Field of Search .............................. 285/921; 4/678; 137/615, 801; 251/368, 366

[56] References Cited

U.S. PATENT DOCUMENTS

| | | |
|---|---|---|
| Re. 25,920 | 11/1965 | Moen . |
| 3,229,710 | 1/1966 | Keller, III . |
| 3,840,048 | 10/1974 | Moen . |
| 3,871,406 | 3/1975 | Anderson . |
| 3,963,212 | 6/1976 | Mullins ................................ 251/145 |
| 3,998,240 | 12/1976 | Liautaud . |
| 4,026,328 | 5/1977 | Nelson . |
| 4,395,018 | 7/1983 | Moen . |
| 4,552,171 | 11/1985 | Farrell et al. . |
| 4,557,288 | 12/1985 | Botnick ................................ 137/315 |
| 4,592,388 | 6/1986 | Wilcox ................................ 285/921 |
| 4,616,856 | 10/1986 | Kowalyshen ....................... 285/921 |
| 4,858,964 | 8/1989 | Usui ..................................... 285/921 |
| 5,096,232 | 3/1992 | Fond et al. ......................... 285/921 |
| 5,267,757 | 12/1993 | Dal Palù ............................. 285/921 |
| 5,297,819 | 3/1994 | Harder ................................ 285/921 |

FOREIGN PATENT DOCUMENTS 908930 10/1962 United Kingdom ............... 285/921

*Primary Examiner*—A. Michael Chambers
*Attorney, Agent, or Firm*—Dorn, McEachran, Jambor & Keating

[57] ABSTRACT

A faucet housing includes a hollow copper base and at least one copper inlet conduit in communication with the hollow interior of the base. The conduit is brazed to the base with a no-lead solder so that the combination of the conduit, solder and base provides a lead-free environment for water passing therethrough. There is a hollow plastic body coaxial with the base, with the hollow interior of the body and the base together being of a size and shape to receive a faucet cartridge therein. There is an outlet opening in the body and there is a seal ring positioned between the body and the base. The body and base include interlocking structure for attaching the two together to form a lead-free faucet housing.

15 Claims, 2 Drawing Sheets

LEAD-FREE FAUCET HOUSING

THE FIELD OF THE INVENTION

Leaded brass has been used in the manufacture of water flow fixtures such as shower heads, faucets, tub spouts and the like since such devices first came into modern use. The amount of lead that is permitted to be leached into the water from such a fixture during an overnight dwell or extensive period of non-use is now controlled by the Environmental Protection Agency. Most all faucets presently in use will pass the "no-lead" codes which were in existence prior to 1993. One exception is the state of California which passed lead leaching requirements in 1988 which may be difficult if not impossible to meet with present-day faucet housings. The Environmental Protection Agency is lowering the level of lead which may be leached into the water after a period of non-use which some faucet products currently in use may not meet. At present there is a major effort on the part of most manufacturers of water flow devices such as faucets, tub spouts and shower heads to design fixtures of this type which will meet current and anticipated no-lead requirements. The present invention is directed toward this end.

SUMMARY OF THE INVENTION

The present invention relates to a lead-free faucet housing and particularly to a faucet housing using readily available non-lead bearing materials.

A primary purpose of the invention is a simply constructed, reliable faucet housing suitable for use either with mixing valves or two-lever faucet cartridges which does not permit any contact between a lead bearing material and water flowing through the faucet.

Another purpose is a faucet housing of the type described utilizing a copper base and a plastic body, the two being suitably connected together to form a lead-free faucet housing.

Another purpose of the invention is a faucet housing as described utilizing a copper base and copper inlet conduits which are brazed thereto through the use of a no-lead solder.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

The present invention will be described in connection with a faucet housing for a single lever mixing faucet. As such there will be hot and cold water inlet connections to the faucet housing and a single outlet. The concepts disclosed herein are equally applicable to a two-handle faucet in which there is a separate valving element for the hot and cold water supplies. U.S. Pat. Nos. Re. 25,920 and 3,840,048, both owned by the assignee of the present application, Moen Incorporated, illustrate single lever mixing cartridges of the type which may be utilized in the faucet housing disclosed herein. U.S. Pat. No. 4,395,018, also owned by Moen Incorporated, illustrates a faucet cartridge for use in a two-handle faucet assembly. A faucet housing such as disclosed herein may be utilized in a two-handle faucet assembly as illustrated in the '018 patent.

The use of leaded brass in the manufacture of water flow plumbing products such as faucets, tub spouts, shower heads and the like has long been the standard practice in the industry. There is, however, a problem which is particularly associated with faucets or other fixtures in which one may drink the discharged water. The Environmental Protection Agency and the individual states are passing increasingly strict regulations as to the amount of lead that can be leached into the water after a prolonged period of non-use, for example water sitting in a faucet overnight. Although most faucet designs will pass current codes, California being one exception, it is clear that the more stringent future requirements may not be met by the current designs of faucets. The present invention provides a lead-free faucet housing in that all of the parts of the faucet housing which come in contact with water are free of lead. The faucet housing is made up of a base and a body. The base is made of copper, which contains no lead, and the body is made of plastic. The inlet conduits for the base are also formed of copper and they are brazed to the copper base with a lead-free solder.

Figure 1:
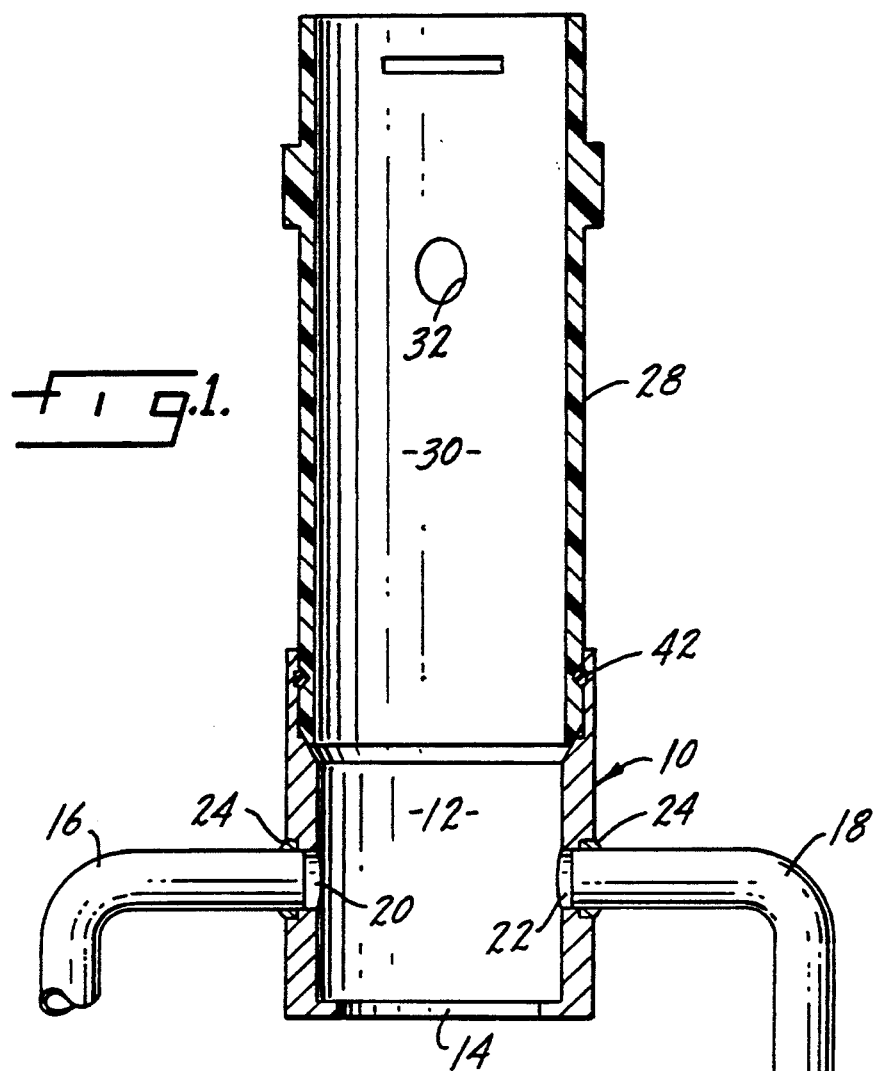
FIG. 1 is an axial section through one embodiment of my improved faucet housing.
Figure 2:
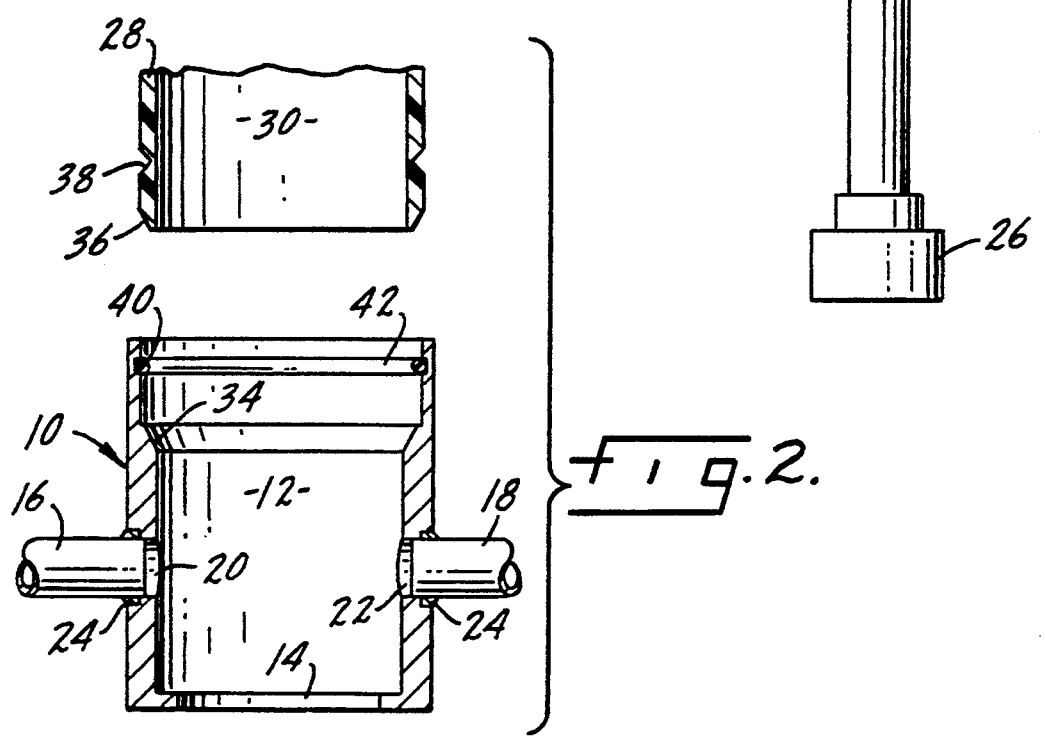
FIG. 2 is a partially exploded view of the faucet housing of FIG. 1, illustrating the connecting portions of the faucet body and faucet base.

In FIGS. 1 and 2, the faucet housing base is indicated at 10 and is shown to have a hollow interior 12 and in this instance an open bottom 14. This particular faucet housing is specifically designed to accept a faucet cartridge or valve, as illustrated in either U.S. Pat. No. Re. 25,920 or U.S. Pat. No. 3,840,048. There are two inlet conduits indicated at 16 and 18 which extend into openings 20 and 22, respectively, in the faucet housing base 10. The conduits 16 and 18 will be brazed, as indicated at 24, by the use of a no-lead solder. Both of the conduits are copper, as is the base 10. A conventional connecting nipple is indicated at 26 and there will similarly be one on the other supply to the faucet housing. The nipples will also be made of copper. Thus, the conduits and the faucet base to which the conduits connect are all made of copper, a lead-free material.

Completing the faucet housing is a body 28 which is cylindrical in form and has a hollow interior 30. The interior 30 in combination with the hollow interior 12 of the base 10 provide the desired space for the mixing valve which controls the flow of water through the faucet. The body 28 may have an outlet opening 32 to convey the mixed water to a point of use. Preferably, the body 28 is formed of a plastic and more particularly, a modified polysulfone is the preferred material.

FIG. 2 illustrates the interconnection between the base 10 and the body 28. The interior of the base has a slanted or tapered seat 34 which will mate with the tapered end 36 of the body 28 when the body is inserted into the base. There is an exterior groove 38 on the outside of the body 28 and there is an interior groove 40 in the base 10 which holds a sealing O-ring 42. When the body 28 is pushed into the base 10, it will move until the tapered end 36 mates with the tapered seat 34. At this position the grooves 38 and 40 will be diametrically opposed and will fully contain the sealing O-ring 42. The O-ring functions as the interlock holding the body and the base together.

Figure 3:
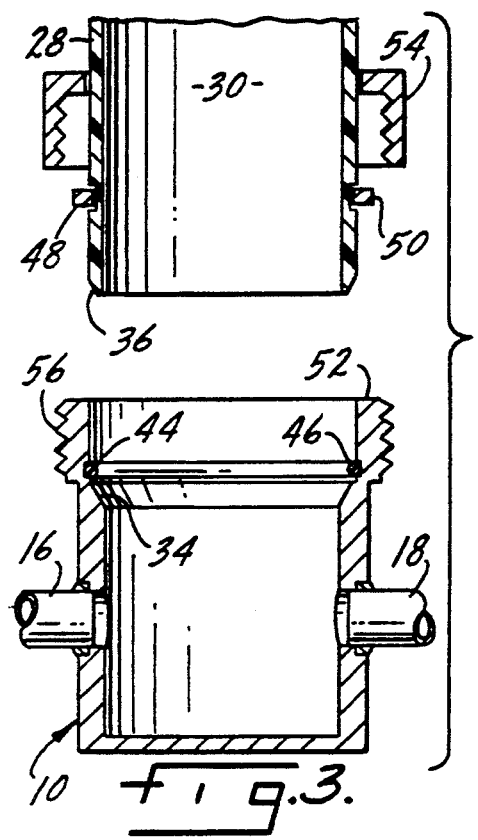
FIG. 3 is a partially exploded view, similar to FIG. 2, but illustrating a second embodiment of my invention.

The embodiment of the invention illustrated in FIG. 3 is essentially the same as shown in FIGS. 1 and 2 except for the means for connecting the body and base together. In the embodiment of FIG. 3 an O-ring 44 is located in a groove 46 which is directly adjacent the slanted seat 34. The exterior of body 28 has a groove 48 within which is positioned a split ring 50. The ring 50 functions as a stop and the body 28 will be inserted into the base 10 until the split ring is seated upon the upper surface 52 of the body 10. At this position the tapered end of the body 28 will be seated upon the slanted seat 34. In order to complete the connection, a nut 54 axially movable on the exterior of the body 28, will be threaded onto the exterior threads 56 of the base 10. The threaded connection will complete the assembly of the body and base into the faucet housing.

Figure 4:
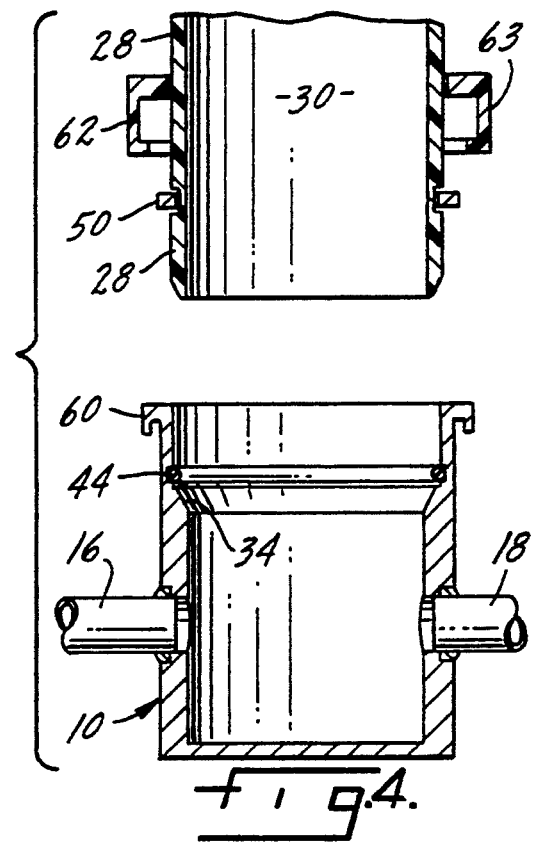
FIG. 4 is a partially exploded view, similar to FIGS. 2 and 3, illustrating a further embodiment of my invention.

In the embodiment of FIG. 4, the only difference from that illustrated in FIG. 3 is the means for connecting the body to the base. The upper end of base 10 has a discontinuous outwardly extending flange 60. Positioned on the exterior of the body 28 is a partially discontinuous rotatable collar 62. These elements are similar to the conventional gas cap connection found on automobiles in that to properly connect the collar 62 with the flange 60, the discontinuous wall 63 of collar 62 is positioned within a discontinuous portion of the flange 60 after which the collar is turned to complete the connection.

Figure 5:
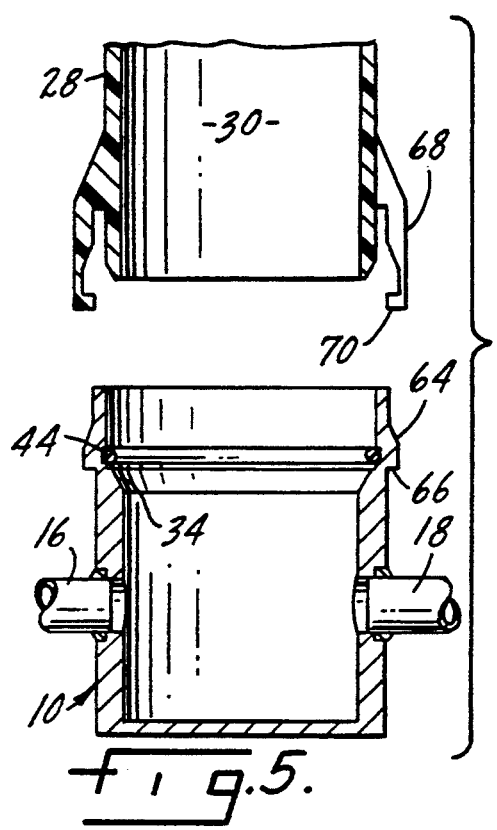
FIG. 5 is a partially exploded view, similar to FIGS. 2, 3 and 4, showing yet a further embodiment of my invention.

In the embodiment of FIG. 5, the exterior of the body 10 has an outwardly directed shoulder 64 which defines a downwardly facing ledge 66. The plastic body 28 has circumferential flexible outwardly extending peripheral arms 68, each with an inwardly directed hook 70. When the body 28 is pushed downwardly upon the base 10, the arms 68 will flex outwardly until they are past the projection 64, after which the hook portions 70 will underlie the ledge 66 firmly attaching the two elements of the faucet housing together.

Figure 6:
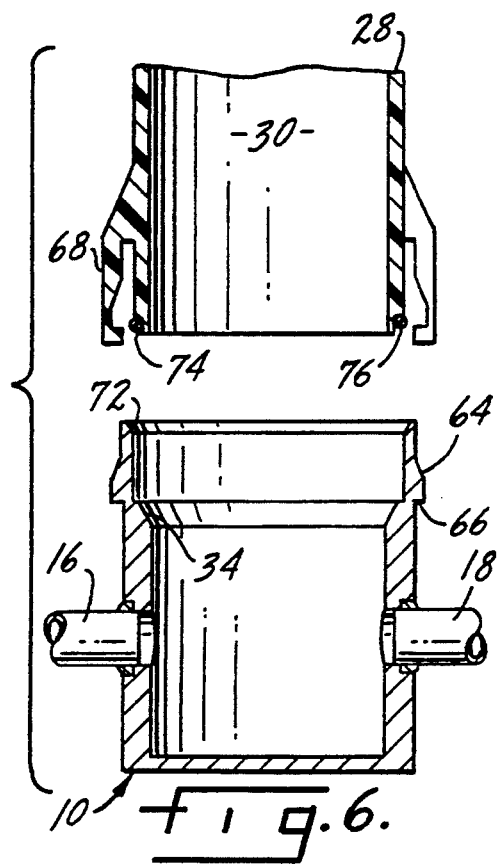
FIG. 6 is a partially exploded view, similar to FIGS. 2, 3, 4 and 5 showing an additional embodiment of my invention.

The FIG. 6 embodiment is the same as that shown in FIG. 5 except for the position of the O-ring seal. In this instance, the upper end of the body 10 has a slanted, inner tapered face 72 and an O-ring 74 is positioned within an exterior peripheral groove 76 on the body 28. When the body is pushed downwardly against the base 10, the O-ring 74 will seat upon the slanted surface 34 as the arms 68 interlock the two elements together. When the elements are so positioned, O-ring 74 will form a seal between the base and the body.

Whereas the preferred form of the invention has been shown and described herein, it should be realized that there may be many modifications, substitutions and alterations thereto.

The embodiments of the invention in which an exclusive property or privilege is claimed are defined as follows:

1. A faucet housing including a hollow base formed of a metallic non-lead bearing material, at least one metallic non-lead bearing inlet conduit in communication with the hollow interior of said base, said inlet conduit being brazed to said metallic base with a no-lead brazing material, and a hollow nonmetallic no-lead body coaxial with said base, the hollow interior of said body and base being of a size and shape to receive a faucet cartridge therein, an outlet opening in said body, a seal ring positioned between said body and said base, and means for attaching said body to said base to form a lead-free faucet housing.

2. The faucet housing of claim 1 characterized in that the base is formed of copper.

3. The faucet housing of claim 2 characterized in that the at least one inlet conduit is formed of copper.

4. The faucet housing of claim 1 characterized in that the no-lead brazing material is a no-lead solder.

5. The faucet housing of claim 1 characterized in that the hollow body is formed of plastic.

6. The faucet housing of claim 5 characterized in that said plastic body is formed of polysulfone.

7. The faucet housing of claim 1 characterized by and including an interior seat in said hollow base, one end of said body being formed and adapted to be in mating contact against said base seat.

8. The faucet housing of claim 7 characterized in that said base seat and said one end of said body are similarly tapered.

9. The faucet housing of claim 1 characterized by oppositely disposed grooves in the interior of said base and the exterior of said body, said seal ring being positioned within said grooves and forming the means for attaching said body to said base.

10. The faucet housing of claim 1 characterized in that the means for attaching said body to said base includes a thread on the exterior of said base and a threaded element mounted on the exterior of said body.

11. The faucet housing of claim 10 characterized by and including a stop element positioned on the exterior of said body limiting inward movement of said body into said base.

12. The faucet housing of claim 1 characterized by and including interlocking means on the exterior of said body and said base forming the means for attaching said body to said base.

13. The faucet housing of claim 12 characterized in that said interlocking means include flexible arms located on said body and a ledge located on said base.

14. A faucet housing including a hollow copper base, at least one copper inlet conduit in communication with the hollow interior of said base, said inlet conduit being brazed to said copper base with a no-lead solder, and a hollow plastic body coaxial with said base, the hollow interior of said body and base being of a size and shape to receive a faucet cartridge therein, an outlet opening in said body, a seal ring positioned between said body and base, and means for attaching said body to said base to form a lead-free faucet housing.

15. The faucet housing of claim 14 characterized by two copper inlet conduits, each brazed to said copper base with a no-lead solder.

* * * * *